(12) United States Patent
Duan

(10) Patent No.: US 10,353,726 B2
(45) Date of Patent: Jul. 16, 2019

(54) TRANSPARENT NETWORK SECURITY FOR APPLICATION CONTAINERS

(71) Applicant: NeuVector, Inc., San Jose, CA (US)

(72) Inventor: Gang Duan, San Jose, CA (US)

(73) Assignee: NEUVECTOR, INC., Milpitas, CA (US)

( * ) Notice: Subject to any disclaimer, the term of this patent is extended or adjusted under 35 U.S.C. 154(b) by 300 days.

(21) Appl. No.: 15/151,455

(22) Filed: May 10, 2016

(65) Prior Publication Data

US 2017/0093921 A1 Mar. 30, 2017

Related U.S. Application Data

(60) Provisional application No. 62/234,586, filed on Sep. 29, 2015, provisional application No. 62/234,545, filed on Sep. 29, 2015.

(51) Int. Cl.
*G06F 9/455* (2018.01)
*H04L 29/06* (2006.01)
*H04L 12/931* (2013.01)
*H04L 12/713* (2013.01)
*H04L 12/725* (2013.01)
*H04L 29/08* (2006.01)

(52) U.S. Cl.
CPC ...... *G06F 9/45558* (2013.01); *G06F 9/45533* (2013.01); *H04L 45/306* (2013.01); *H04L 45/586* (2013.01); *H04L 49/70* (2013.01); *H04L 63/1408* (2013.01); *H04L 67/36* (2013.01); *G06F 9/455* (2013.01); *G06F 2009/45562* (2013.01); *G06F 2009/45587* (2013.01); *G06F 2009/45595* (2013.01)

(58) Field of Classification Search
CPC ........ G06F 21/52; G06F 21/53; G06F 21/566; G06F 9/455; G06F 9/45504; G06F 9/45533; G06F 9/45558; G06F 2009/45562; G06F 2009/45575; G06F 2009/45587; G06F 2009/45595; H04L 45/306; H04L 45/586; H04L 49/70; H04L 63/1408; H04L 63/20; H04L 67/36
See application file for complete search history.

(56) References Cited

U.S. PATENT DOCUMENTS 8,259,722 B1 9/2012 Kharitonov
8,612,547 B1 12/2013 Dayan
(Continued)

*Primary Examiner* — Theodore C Parsons
(74) *Attorney, Agent, or Firm* — Fenwick & West LLP

(57) ABSTRACT

A security container of a container environment receives an indication of a new application container connected to a virtual switch of a server, the connection established by a container service providing operating system-level virtualization for each application container. The security container disconnects a first connection from the virtual switch to the application container at the application container. The security container connects the first connection from the virtual switch to the security container. The security container establishes a second connection from the security container to the application container. The security container receives data from the application container. The security container inspects the received data for network security. The security container forwards the received data to an intended destination via the virtual switch.

20 Claims, 6 Drawing Sheets

(56) References Cited

U.S. PATENT DOCUMENTS

| | | | |
|---|---|---|---|
| 8,938,611 B1* | 1/2015 | Zhu | H04L 49/70 713/153 |
| 9,391,826 B1 | 7/2016 | Dayan | |
| 2006/0173983 A1 | 8/2006 | Naito et al. | |
| 2007/0249203 A1 | 10/2007 | Snawerdt | |
| 2008/0075093 A1 | 3/2008 | Huang et al. | |
| 2008/0301205 A1 | 12/2008 | Alpern et al. | |
| 2009/0293066 A1 | 11/2009 | Low | |
| 2011/0239010 A1 | 9/2011 | Jain et al. | |
| 2011/0283278 A1* | 11/2011 | Murrell | G06F 9/5077 718/1 |
| 2012/0203890 A1 | 8/2012 | Reynolds et al. | |
| 2012/0290848 A1 | 11/2012 | Wang et al. | |
| 2013/0074066 A1* | 3/2013 | Sanzgiri | H04L 49/70 718/1 |
| 2013/0332982 A1* | 12/2013 | Rao | H04L 63/08 726/1 |
| 2014/0053150 A1 | 2/2014 | Barnett et al. | |
| 2014/0189777 A1 | 7/2014 | Viswanathan et al. | |
| 2015/0007265 A1 | 1/2015 | Aissi et al. | |
| 2015/0331635 A1* | 11/2015 | Ben-Shaul | G06F 9/5061 711/120 |
| 2016/0050272 A1 | 2/2016 | Raduchel | |
| 2016/0162685 A1* | 6/2016 | Feroz | G06F 21/53 726/22 |
| 2016/0182540 A1 | 6/2016 | Ghosh et al. | |
| 2016/0212128 A1 | 7/2016 | Pike | |
| 2016/0359955 A1 | 12/2016 | Gill et al. | |
| 2016/0380909 A1 | 12/2016 | Antony et al. | |
| 2016/0380916 A1 | 12/2016 | Gnaneswaran et al. | |
| 2017/0003995 A1 | 1/2017 | Hu et al. | |
| 2017/0140158 A1 | 5/2017 | Gounares | |
| 2017/0257357 A1* | 9/2017 | Wang | G06F 8/63 |
| 2017/0264622 A1* | 9/2017 | Cooper | G06F 21/606 |

\* cited by examiner

TRANSPARENT NETWORK SECURITY FOR APPLICATION CONTAINERS

CROSS REFERENCE TO RELATED APPLICATION

This application claims the benefit of U.S. Provisional Application No. 62/234,586, filed Sep. 29, 2015, and claims the benefit of U.S. Provisional Application No. 62/234,545, filed Sep. 29, 2015, both of which are incorporated by reference in their entirety.

FIELD OF ART

The disclosure generally relates to the field of network containerization, and specifically to non-intrusive and transparent security monitoring of containerized services.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hardware servers during live operation, e.g., for load balancing. Another advantage is that, since virtual emulation of resources, such as in a virtual machine (VM) environment, is not being performed to provide resources to the containers, the overhead compared to a VM-based environment is much lower. However, with this new container system, network security becomes a challenge with the multiple containers. Hence, what was lacking, inter alia, were systems and methods for monitoring network security in a containerized network while supporting a non-intrusive behavior and transparency.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example environment capable of network security in a container system, according to an example embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for network security monitoring in a container environment. In one embodiment, a security container of the network security monitoring system receives an indication of a new application container connected to a virtual switch of a server, the connection established by a container service providing operating system-level virtualization for each application container. The security container disconnects a first connection from the virtual switch to the application container at the application container. The security container connects the first connection from the virtual switch to the security container. The security container establishes a second connection from the security container to the application container. The security container receives data from the application container, inspects the received data for network security, and transmits the received data to an intended destination via the virtual switch.

Example Container System with Network Security

Figure 1:
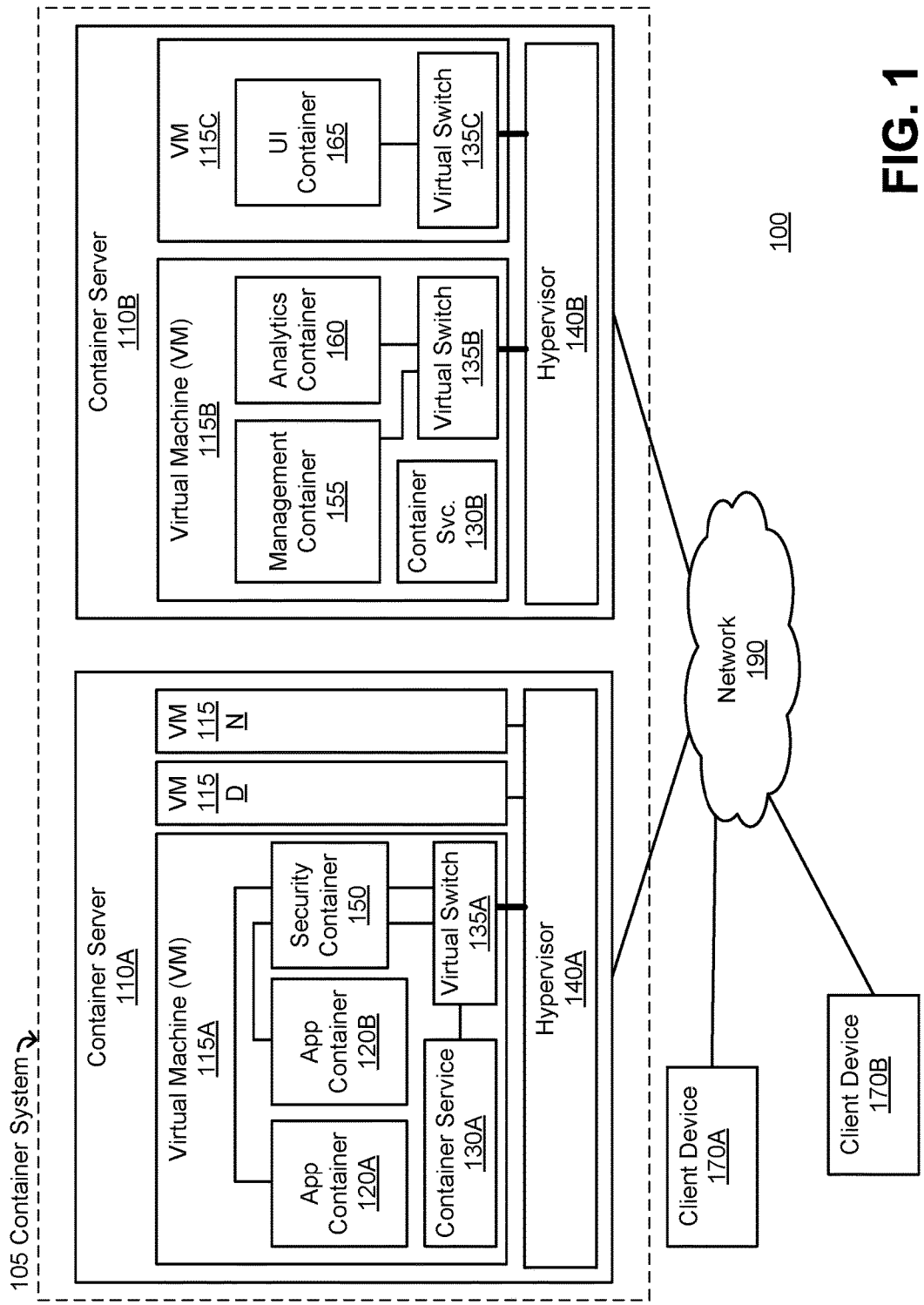

FIG. 1 illustrates an example environment 100 capable of network security in a container system, according to an embodiment. The environment 100 includes the network 190, one or more client devices 170, one or more container servers, e.g., 110A, 110B (generally, 110) of a container system 105, with each container server 110 including one or more application ("app") containers, e.g., 120A, 120B (generally 120). A container server 110 also may include a security container 150, a management container 155, an analytics container 160, and/or a user interface (UI) container 165. Although the two illustrated container servers 110A and 110B include different containers, this is not meant to indicate that the container servers 110A and 110B are different. The containers within each container server 110 may be interchangeable, and thus each container server 110 is largely the same. Although the illustrated environment 100 may include the elements shown in FIG. 1, in other embodiments the environment 100 may include different elements. Furthermore, the functionalities of each element may be distributed differently among the elements in other embodiments.

The network 190, which can be wired, wireless, or a combination thereof, enables communications among the client devices 170 and the one or more container servers 110 of the container system 105 and may include the Internet, a local area network (LAN), virtual LAN (VLAN) (e.g., with VPN), wide area network (WAN), or other network. In one embodiment, the network 190 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The client devices 170 are electronic devices used by users to perform functions such as consuming digital content, executing software applications, browsing websites hosted by web servers on the network 190, downloading files, and interacting with the container servers 110. For example, the client devices 170 may be dedicated e-readers, smartphones, wearables (e.g., smartwatches or pendants), or tablets, laptops, or desktop computers configured similar to an exemplary machine (or computing system) described with FIG. 6. A client device 170 may include one or more applications, such as a web browser, to interact with services provided by the container servers 110. Although two client devices 170 are illustrated in FIG. 1, in other embodiments the environment 100 includes more client devices 170.

The container servers 110 are electronic devices that communicate via network 190 and may execute hypervisors, virtual machines (VMs), and one or more containers. Each container server 110 may be located at a different physical location than another container server 110. However, the container servers 110 may communicate with each other via dedicated network links, such as a tunnel. This may allow services on each container server, such as the container services 130, to communicate with each other within a virtual local network. In one embodiment, the container servers 110 include an operating system that enables operating-system-level virtualization, such that the kernel of the operating system allows for multiple isolated user-space instances (i.e., "containers"). Additional details regarding such a container system is described below. In one embodiment, the container servers 110 include an operating system that enables hardware virtualization, which is a method of simulating or emulating a separate set of hardware resources on which a guest operating system or other software to executes. In such a case, the container server 110 may include one or more hypervisors 140 for hardware virtualization, on which one or more virtual machines (VMs) 115 execute.

The hypervisor 140 is a software and/or hardware component executing on the container server 110 that creates and runs the VMs 115. The hypervisor 140 may execute directly on the hardware (e.g., processor, memory, storage, etc.) of the container server 110, may execute on an operating system of the container server 110, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 115 are emulations of a computer system or hardware platform. Each VM 115 emulates, either fully or partially, a set of hardware resources for a computer system. For example, the VM 115 may emulate a processor, memory, storage, graphics adapter, interrupts, and so on. Although the emulation may increase the resources needed to execute a task, and may lower efficiency, as noted, the VM 115 provides other benefits, such as the execution of multiple operating system versions and high availability, among other features.

Each VM 115 may execute an operating system that supports a container environment. As used here, container environment refers to the system upon which the containers are executing. In the illustrated example, the container environment is the VM 115 and operating system executing on the VM 115. However, in other cases, the container environment may be a physical system such as the container server 110 itself and the operating system executing on that container server 110.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable file systems (e.g., aufs) in order to isolate each container. These features restrict each container's view of the operating system's resources. For example, an app container 120 may only be able to view file systems that are authorized for that app container 120. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 115, in another embodiment the container environment executes directly on the hardware of the container server 110.

The virtual switch 135 may emulate a hardware switch in software. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 135 may provide functions that are similar to the above-described hardware switch, but instead of being implemented in hardware, the virtual switch 135 may be implemented in software (or in a hybrid software/hardware implementation). For example, the virtual switch 135 may route communications arriving at the container server 110 or VM 115 to the correct container or other service within the container server 110 or VM 115. As another example, the virtual switch 135 may route communications between containers of the same container server 110 or VM 115. The virtual switch 135 performs the routing using the network addresses of each container executing within the container server 110. While the virtual switch 135 is shown to be part of the VM 115 in the illustrated embodiment, in another embodiment the virtual switch 135 may be part of the hypervisor 140 or the VM 115 and the hypervisor 140 may each have a virtual switch.

The container service 130 is a collection of services to assist with the deployment and execution of containers on the VMs 115. Although two container services 130A and 130B are illustrated, they perform similar functions and are described together here. The container service 130 may include an application programming interface (API) for the use of software developers creating containerized software. The API may allow a software developer to easily create a containerized software application without having to implement operating system and operating system version specific functions, which are instead implemented by the container service 130. For example, the container service 130 may offer API function calls that may be used by a container to perform certain functions related to creating a container. The container service 130 may manage the isolation of resources for each container. These resources may include filesystem resources (e.g., system libraries), user and user groups, process trees (e.g., viewable processes), network resources, device resources, and inter-process communication resources (e.g., semaphores). The container service 130 may perform the isolation through the use of permissions restrictions, disk quotas, central processor unit (CPU) scheduling, input/output (I/O) scheduling, counters (e.g., beancounters), and so on.

The API of the container service 130 also may include functions to allow for a software developer to easily deploy containers on multiple hardware platforms in a distributed fashion, and for each container to be able to share data with other containers in a seamless fashion. For example, the container service 130 may allow one container to be able to access a same shared pool of data as another container through a standard API, without the need to manage the memory space directly.

The container service 130 also may be able to combine multiple container servers 110 or other hardware platforms into a single virtual host (e.g., a clustered host). The container service 130 also may include extensions to allow for easy integration with cloud services providers, such that a software developer may easily deploy a containerized application to one of these cloud services. An example of container service is Docker®.

After receiving a request from an app container 120 (e.g., via the API), the container service 130 may also create a connection between the app container 120 and the virtual switch 135. This connection includes a port pair, with one port connected to the virtual switch 135, and the other pair connected to the app container 120. This connection also may include the network hardware layer address (e.g., media access control (MAC) address) and network address (e.g., Internet Protocol (IP) address) for the app container 120. This information provides the app container 120 with its own network address and isolated network path. The connection may be used by the app container 120 to route to other containers or destinations that are connected to network 190. The container service 130 also may provide the connection as a tunneled connection.

The app container 120 is a containerized software application executing in the container system 105. In the illustrated embodiment of FIG. 1, the app container 120 is executing in the VM 115. However, in other embodiments, the app container 120 may execute directly on the container server 110 (via the operating system of the container system 115) and not within a VM. Although two app containers 120A-B are shown here, in other embodiments each VM 115 (or container server 110) may have multiple app containers. The app container 120 may include any executable code as created by a software developer. The app container 120 may include a network interface to communicate with other entities in the network 190 via the virtual switch 135. As noted, each app container 120 may be isolated from other app containers 120. Each app container 120 may thus be in its own "domain." As noted, these domains may be created using different method of operating-system-level virtualization, such as through the use of namespaces (e.g., Linux namespaces).

In one example embodiment, the app container 120 may be stored as one or more images that include the executable code and other data for the containerized software application of the app container 120. Each image in the app container 120 may include updates and changes to the software application. These images may be part of a union file system, and may be joined together by the container service 130, along with a base image, in order to generate the complete application package. The running app container 120 comprises this complete application package. An additional read-write layer also may be added by the container service 130 to the running app container 120, as the images are read only.

The security container 150 may intercept communications from the app containers 120 for network security monitoring. As noted above, in a typical containerized environment, the container service 130 facilitates the connection of an app container 120 to the network 190. This connection may also be tunneled using an encryption protocol (e.g., secure sockets layer (SSL)). Due to this type of connection, intercepting the traffic of the app container 120 transparently is challenging. Furthermore, each container is self-contained, and as noted above, may be packaged as a read-only image. Thus, modifying the app container itself also may be undesirable.

Instead, the security container 150 monitors the VM 115 (or container server 110 if the container environment is the container server 110 itself) to determine if any new app containers 120 are created. To monitor the container environment, the security container 150 may communicate with the container service 130 or request for and/or be given special administrative rights that allow it to query or determine the processes executing on the VM 115. When the security container 150 determines that a new app container 120 is created and connected to the virtual switch 135, the security container 150 may intercept the network traffic of the new app container 120 by moving the connection between the virtual switch 135 and the new app container 120 such that the connection may be made between the virtual switch 135 and the security container 150 instead. The security container 150 also may create a new connection between the new app container 120 and the security container 150. The security container 150 may also save and recover any existing routing entries during this process.

After performing this intercept operation, network traffic to and from the new app container 120 flows through the security container 150. The security container 150 may be able to monitor this traffic and inspect it to determine if a network security issue exists. The security container 150 may perform various actions on the traffic, such as forwarding it, making a copy of it, and so on. Although a single security container 150 is illustrated, the container system 105 may include multiple security containers 150 clustered together. Additional details regarding the security container 150 are described below with reference to FIGS. 2-3.

The container system 105, in one embodiment, also includes an analytics container 160 to analyze information received from the security containers 150. The analytics container 160 may request or receive longs and statistics from the security containers 150 regarding intercepted network traffic and other data. The analytics container 160 may analyze this information to produce various results. For example, the analytics container 160 may determine whether a denial of service attack is occurring within some of the application containers 120. The analytics container 160 may also forward the information and analytical results to the management container 155. The container system 105 may include multiple analytics containers 160 to allow for redundancy and high availability. Additional details regarding the analytics container 160 are described with reference to FIG. 4B.

The container system 105, in one embodiment, also includes one or more management containers 155 for configuration and monitoring of the security containers 150 in the container system 105. The management container 155 may configure the settings and rules for the security containers 150 and the analytics container 160 in the container system 105. For example, these rules may indicate what type of network traffic to log or to filter out. The management container 155 monitors the activities of other management containers 155 and the security containers 150. Activities monitored may include start/stop activities, statistics, and so on. The management container 155 may also listen for reports and other information from the analytics container 160. Additionally, the management container 155 may receive instructions from the user interface (UI) container 165 regarding the configuration of rules in the security containers 150 and other options. Furthermore, the management container 155 may also present the reports and other information collected by the security containers 150 and analytics containers 160 to a user via the UI container 165. The container system 105 may include multiple management containers 155 to allow for redundancy and high availability. Additional details regarding the management container 155 are described with reference to FIG. 4A.

The container system 105, in one embodiment, also includes a user interface (UI) container 165 to provide a user interface to a user. The UI container 165 may interface with a user using a graphical user interface (GUI) or a command line interface (CLI). As noted above, the UI container 165 communicates with the management container 155 and via the user interface the UI container 165 may indicate to the management container 155 the various configuration options requested by a user. The UI container 165 may also receive information, such as various analytical reports, statistics, and other data from the management container 155. If the interface is a GUI, the interface may be presented using various GUI elements, such as drop down menus, tables, and so on, and may be interfaced using interface devices such as a mouse and touchscreen. The UI container 165 may also present the data received from the management container 155 using various graphical presentation schemes, such as a scatterplot, table, graph, and so on.

Using the system described above, the security of a container environment (i.e., an environment supporting operating-system-level virtualization) may be monitored transparently without intrusion into the individual app containers and without modification to every single app container, as would be the case in a traditional approach. Furthermore, no specialized hardware or additional software components are required. Instead, a security container may discretely insert itself into the flow of network traffic between the app container and the outside network in the method described above, and is able to monitor traffic to and from the app containers.

The security container may be inserted without requiring modifications to the container service, VM, operating system, or other component of the container system 105. Instead, the security container may use existing tools of the operating system and container service to monitor the traffic in the container environment. The monitoring of the traffic using a security container rather than a separate security system on another hardware device also provides the benefit of having the security container be able to monitor traffic that is tunneled between different systems. For example, in the case of the VMs 115 described above, since the security container 150 sits within the VM, it is able to monitor traffic that is tunneled between the VMs. If a security system were to sit outside the VM 115, then it would not necessarily be able to monitor the tunneled traffic, which may be encrypted.

Example Security Container of a Container System

Figure 2:
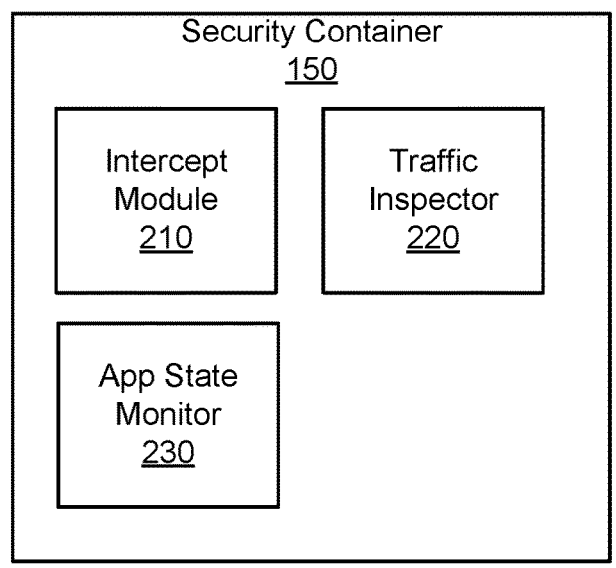
FIG. 2 illustrates the security container of FIG. 1, according to an example embodiment.

FIG. 2 illustrates the security container 150 of FIG. 1, according to an embodiment. As illustrated, the security container 150 includes an intercept module 210, a traffic inspector 220, and an app state monitor 230. Although the illustrated security container 150 includes the elements shown in FIG. 2, in other embodiments the security container 150 may include different elements. Furthermore, the functionalities of each element may be distributed differently among the elements in other embodiments.

The app state monitor 230 monitors the status of app containers, such as the app containers 120, of a container environment (e.g., the VM or container server) on which the security container 150 is resident. In order to monitor the status of the app containers 120, the app state monitor 230 may utilize the APIs or other services of the container service 130. The app state monitor 230 may send a request to the container service 130 to determine the identification of the app containers 120 in the current container environment. Alternatively, the app state monitor 230 may communicate with the container service 130 to listen or observe for container related events, such as the creation or destruction of a container (e.g., container start and stop events).

In another embodiment, the app state monitor 230 uses system commands, such as a system call or a shell command such as "top," to monitor the processes created by the app containers 120. The app state monitor 230 may require elevated or special privileges within the container environment to execute these commands.

When the app state monitor 230 determines that an app container 120 is started or initiated, the app state monitor 230 may notify or cause the intercept module 210 to intercept the communications from the newly started app container 120 as described below.

In another case, the security container 150 is initiated in the container environment after one or more app containers 120 are already running in the environment. In this case, the app state monitor 230 may use commands provided by the container service 130 or using system commands as described above to determine the identity of the currently running app containers 120 and the information regarding their connections to the virtual switch 135. The app state monitor 230 may notify the intercept module 210 to intercept these running app containers 120.

In another case an app container 120 may be deactivated or stopped in a container environment. The app state monitor 230 may use the above methods to determine that the app container 120 has requested to be stopped, and may notify the intercept module 210 that the traffic from the app container 120 should no longer be intercepted.

In one embodiment, the app state monitor 230 may also monitor other information regarding the application containers 120, such as their performance, resources used, number of processes opened, number of file handles opened, number and status of network connections, and so on. The app state monitor 230 may determine this information using the API of the container service 130 or using system commands (e.g., "ss" for network connections in Linux). The app state monitor 230 may forward this information to the management container 155 or the analytics container 160.

The intercept module 210 intercepts connections between the app containers 120 and the virtual switch 135. When the intercept module 210 receives a notification from the app state monitor 230 that a particular app container 120 is initiated, the intercept module 210 determines, according to configuration rules, whether the traffic for that app container 120 should be intercepted. These rules may be determined by the intercept module 210 dynamically, or may be pre-configured.

The preconfigured rules may indicate that an app container 120 should be monitored if it is of a specific type, name, owner, or has some other characteristic. These characteristics may include the number and/or type of resources requested from the container service 130, such as a number of processor cycles, disk quota, network resources, memory resources, thread priority, security certificates, user privilege level, and so on.

To determine the rules dynamically, in one embodiment the intercept module 210 receives the app monitoring data from the app state monitor 230 as described above and determines whether a monitored parameter of the app container 120 is behaving outside of a normal statistical bounds. For example, the intercept module 210 may determine that the number of open network connections of the app container 120 is higher than a historical average for that type of app container 120 (the historical data may be received by the intercept module 210 from the management container 155). In such a case, the intercept module 210 may determine that the traffic from the app container 120 should be intercepted. The intercept module 210 may make this determination upon first receiving the notification from the app state monitor 230, or at a later time once the intercept module 210 determines that the app container 120 is exhibiting the abnormal behavior.

If the intercept module 210 determines that the traffic for the app container 120 should be intercepted, the intercept module 210 stores the routing entries of the app container 120 (e.g., in memory). These routing entries indicate the connections of the app container 120. For example, the routing entries may indicate various established connections, disconnected connections, stale connections, initializing connections, routing paths, ports used, and so on, for the app container 120. The intercept module 210 also stores the network address (e.g., IP address) of the app container 120.

To perform the interception of the connection, the intercept module 210 may switch the domain context to the app container 120. In other words, the intercept module 210 switches the current domain (e.g., the current namespace) to the domain of the app container 120. This allows the intercept module 210 to access the processes, network connections, and other resources of the app container 120.

In one embodiment, instead of switching domain contexts, the intercept module 210 may have elevated privileges within the container environment, and is able to directly modify the network connection data for the app container 120 via the underlying operating system of the container environment by executing one or more system commands.

The intercept module 210 removes the interface from the app container 120, and reconnects or binds the interface to the security container 150 instead. In one embodiment, the intercept module 210 determines the name of the interface for the app container 120 (e.g., "eth0") and moves this interface to the security container 150. The intercept module 210 may rename the interface (e.g., using system commands such as an API or CLI tool) to prevent conflicts with existing interfaces at the security container 150.

The intercept module 210 may notify the container service 130 that it is now using this interface, or may configure routing information within the container environment to indicate that the interface now is associated with the security container 150. For example, the intercept module 210 may issue a system command to bind a socket to the moved interface. After moving the connection, one port of the port pair of the connection is associated with the security container 150, while the other port pair remains with the virtual switch 135.

The intercept module 210 also creates a new connection between the app container 120 for which the intercept module 210 moved the original connection and the security container 150. The intercept module 210 may create the connection in the same fashion as the container service 130 (which may vary based on the type of container service used). For example, the intercept module 210 may create a connected port pair, with one port associated with the app container 120, and the other port associated with the security container 150. The intercept module 210 may use the API of the container service 130 to create this connection, may use the API of the container service 130 to create a standard connection between the app container 120 and the virtual switch 135 and then modify it to move the connection to the security container 150, or use system commands (such as creating a socket) to create the connection.

After establishing the new connection from the app container 120 to the security container 150 and to the virtual switch 135, the intercept module 210 assigns the original network address to the port associated with the app container 120, and restores the original routing entries that the intercept module 210 previously stored.

Continuing, the intercept module 210 may insert the security container 150 within the flow of the connection between the app container 120 and the virtual switch 135 in a transparent fashion. Since the connection with the virtual switch 135 may be dependent upon the implementation of the container environment (e.g., different operating systems or distributions may use different types of virtual switches), by leaving the connection with the virtual switch untouched, the intercept module 210 has the benefit of not necessarily having to know how to interface with the virtual switch 135 using commands that are compatible with the virtual switch 135. However, the intercept module 210 is not limited to such an embodiment, as with the proper knowledge of the virtual switch 135 architecture, the intercept module 210 can instead disconnect the connection from the virtual switch 135, connect this connection to the security container 150, and create a new connection from the security container 150 to the virtual switch 135.

Additionally, in one embodiment, the intercept module 210 maintains a single connection from the security container 150 to the virtual switch 135. When a new app container 120 is added to the container environment, the intercept module 210 intercepts the connection between the app container 135 and the virtual switch and moves it so that the connection is from the app container 135 to the security container 150. Although having a single connection to the virtual switch 135 may reduce certain flexibility, in some cases the intercept module 210 would have to perform routing functions in order to properly route the traffic from the multiple connections to the app containers 120 into a single connection to the virtual switch 135.

In some cases, an app container 120 may have multiple interfaces with multiple connections to the virtual switch 135 or to elsewhere. In such a case the intercept module 210 may perform the intercept process as described above for each interface of the app container 120. Thus, for every interface/connection of the app container 120 to the virtual switch 135, the intercept module 210 creates a connection between the app container 120 and the security container 150 and moves the connection between the app container 120 and the virtual switch 135 to the security container 150 similar to the process described above.

Although a particular process with technical details for intercepting the traffic from an app container 120 is described above, in other embodiments the technical details for creating and moving connections may differ from that described above depending upon the container environment (e.g., operating system, available tools and APIs). Thus, the description above is not limited to a particular set of technical details or tools, and may be implemented by one skilled in the art in differing container environments as well. Additionally, in one embodiment, the functionality of the intercept module 210 and the traffic inspector 220 are combined into a single module.

The traffic inspector 220 inspects traffic to and from the app containers 120 that have been intercepted by the intercept module 210. The traffic inspector 220 inspects any packets that have been sent or received for an app container 120 based on one or more rules. These rules may set criteria and indicate whether packets meeting these criteria should be forwarded or should be dropped. The criteria may be specific, or may be general. Specific criteria may indicate explicit characteristics of the packets, such as a source network address, a type of packet, the contents of a packet, the headers of a packet, and so on. These specific criteria may only match a small number of packets. General criteria may match a broader range of packets, and may indicate general characteristics of packets, such as ranges of addresses, ranges of sizes, and so on.

The rules may also be dynamic, such that they instruct the traffic inspector 220 to drop or keep packets based on a dynamic analysis of the contents of the packets. These rules may also indicate to the traffic inspector 220 to base such an analysis on the current as well as past packets, or on other trends in the data that is analyzed. For example, a rule may indicate that a packet should be dropped based on an analysis of a recent number of packets arriving from a particular source. If the number and format of those packets are very similar (e.g., a checksum indicates that the packet bodies are identical), then the rule may indicate to the traffic inspector 220 to drop the packet as it might be part of a denial of service attack. If no rule applies to the packet, the traffic inspector 220 may by default forward the packet or drop it. The rules may also include rules that allow the traffic inspector 220 to perform deep packet inspection, denial of service mitigation, anti-virus scanning, access control list policy control, application identification, firewall services, traffic encryption/decryption, and so on.

The traffic inspector 220 may in one embodiment allow all packets through a connection (e.g., as a "network tap"), while copying each packet and performing a security inspection on the packet based on the rules as described above. This allows the packet to be immediately forwarded to its destination without delay.

When inspecting the intercepted traffic, the traffic inspector 220 may also identify, using the packet's headers, whether the packet belongs to an existing session (e.g., a prior stream of packets). The traffic inspector 220 may associate the session with packet. Otherwise, the traffic inspector 220 may indicate a new session for this packet.

When a rule indicates that a packet should be dropped or forwarded, the traffic inspector 220 may log this instance, along with metadata for the packet, such as timestamp, source, destination, header information, associated rule, associated session, and so on. In some cases, the traffic inspector 220 may record more detailed information for packets which a rule indicates should be dropped rather than packets which are forwarded. The traffic inspector 220 may forward this logged information to the analytics container 160.

Example Scenario of Intercepting Communications of an App Container

Figure 3A:
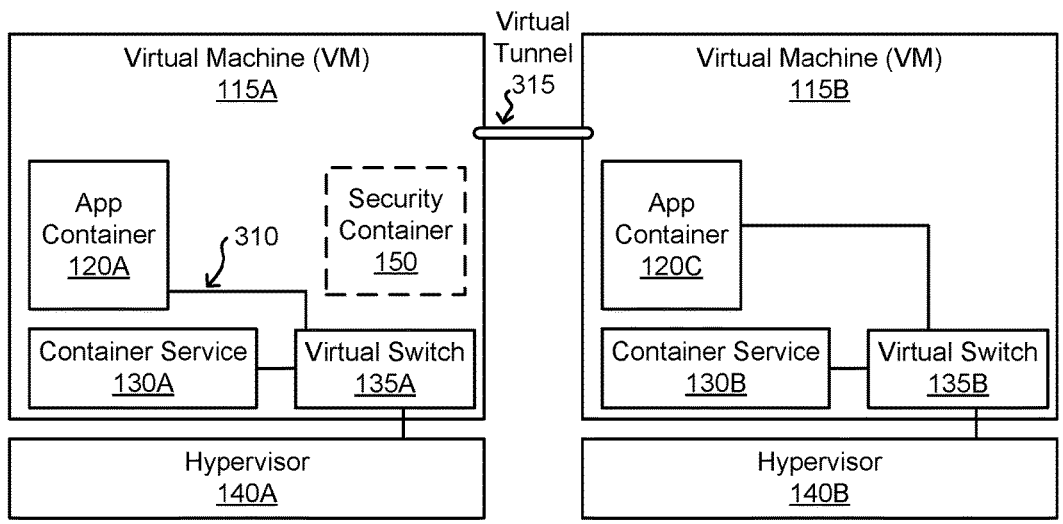
FIG. 3A illustrates an example of a container environment prior to intercepting the traffic of an app container, according to an example embodiment.
Figure 3B:
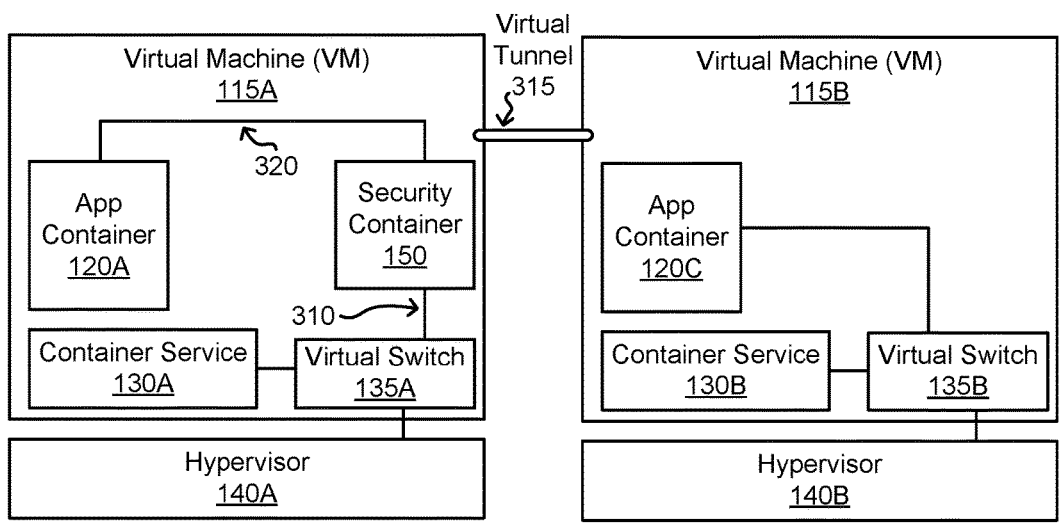
FIG. 3B illustrate an example of the security container subsequent to intercepting the traffic of an app container, according to an example embodiment.

FIGS. 3A-B illustrate an example of the security container 150 intercepting the traffic of an app container 120, according to an embodiment. FIG. 3A shows the initial configuration of the app container 120 within the container environment. An app container 120A may be connected via the connection 310 to the virtual switch 135A. Using this connection, the app container 120A may connect via the virtual tunnel 315 to the app container 120C, which is connected to the virtual switch 135B. FIG. 3B show that at some point, a security container 150 is initiated on the VM 115A that has the app container 120A. As described above, the security container 150 takes the connection 310 and moves it so that it now connects the virtual switch 135A to the security container 150 instead of to the app container 120. The security container 150 also creates a new connection 320 between the app container 120A and the security container 150. The security container 150 also backs up and restores the routing information for the app container 120A as described above. After creating the new connection 320, the app container 120A is once again able to use the virtual tunnel 315 to communicate with the app container 120C.

As the security container 150 is within the VM 115A, it may be able to inspect the packets from app container 120A. This is in contrast to a security system which might attempt to inspect the traffic in virtual tunnel 315. As the virtual tunnel 315 may be encrypted, such an external security system would not be able to decode the data travelling through the tunnel in order to inspect packets. Instead, the security container 150, by being within the VM 115A, may be able to directly read, or use ready available security certificates to decode the traffic (e.g., packets) sent to and received by the app container 120A.

Example Management and Analytics Containers in a Container System

Figure 4A:
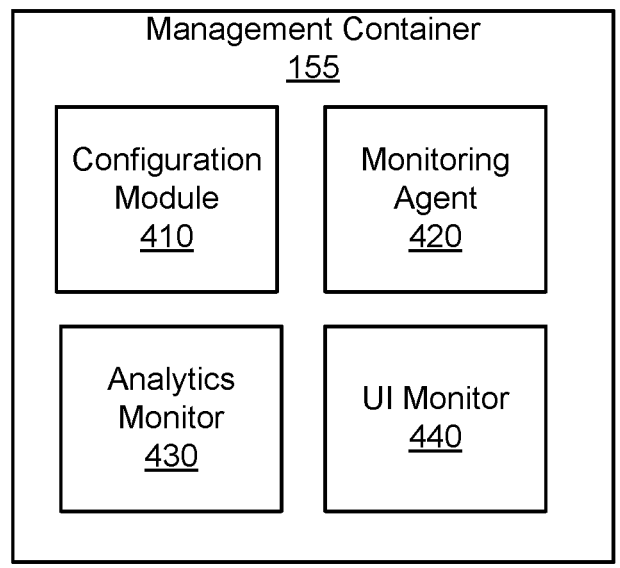
FIG. 4A illustrates the management container of FIG. 1, according to an example embodiment.

FIG. 4A illustrates the management container 155 of FIG. 1 according to an embodiment. As illustrated, the management container 155 includes a configuration module 410, a monitoring agent 420, an analytics monitor 430, and a UI monitor 440. Although the illustrated management container 155 includes the elements shown in FIG. 4A, in other embodiments the management container 155 may include different elements. Furthermore, the functionalities of each element may be distributed differently among the elements in other embodiments.

The UI monitor 440 may monitor communications from the UI container 165 to determine if a user has provided, updated, or modified configuration settings. These configuration settings may affect the operation of the management container 155, the analytics container 160, or the security container 150, and are described in further detail below. Once the UI monitor 440 receives configuration settings from the UI container 165, the UI monitor 440 forwards the configuration settings to the configuration module 410 to process and distribute among the different containers.

The UI monitor 440 may also forward information from the security containers 150 and the analytics containers 160 (described below) to the UI container 165.

The configuration module 410 configures the security containers 150 and analytics containers 160 based on settings provided by a user via the UI container 165. The configuration module 410 may configure settings for the management container 155 based on settings provided by the user via the UI container 165 or based on a configuration file. These settings may include but are not limited to: 1) how many management containers 155 to initiate over separate container environments within the container system 105 to ensure high availability, 2) a reporting frequency, 3) which types of information to report to the UI container 165 for the user, 4) what types of alerts to send to the user, 5) what communication channels (e.g., email, instant message, text message, phone call) to use when sending reports or alerts in addition to the UI container 165, 6) access rights and privileges for different users, 7) escalated user right credentials for the container servers 110 or VMs 115, and 8) operating system versions and system commands available for the container servers 110 or VMs 115. The configuration module 410 may receive additional configuration options for the management container 155 depending upon the features provided by the management container 155.

The configuration module 410 may also configure settings for the security containers 150. These may include those settings described above for the management containers 155, as well as the rules described above for the traffic inspector 220. For example, the configuration module 410 may instruct a security container 150 to drop packets that arrive from a particular destination address.

The analytics monitor 430 receives data and reports from the analytics container 160 and forwards this data to the UI monitor 440 to send to the UI container 165, depending upon the configuration set by the configuration module 410. The data received by the analytics monitor 430 may include system event logs, security event logs, network traffic logs, and other log data, as well as reports, such as traffic trends, suspicious activity, and so on, as described below with regards to FIG. 4B. Depending upon the configuration settings set by the configuration module 410, some or all of this data may be forwarded by the UI monitor 440 to the UI container 165, stored locally for a period of time or until a storage threshold is reached, or discarded. For example, the configuration settings may indicate to only present generated reports regularly to the user, while storing logs on a rotating basis based on a storage threshold (e.g., store up to 100 MB of logs, and rotate out old log entries for new when the 100 MB threshold is reached).

The monitoring agent 420 monitors for events, such as notifications and other management activities from the security containers 150 and the other management containers 155. These events may include but are not limited to: 1) container star/stop activities, 2) container statistics (e.g., resources used, amount of traffic inspected, number of log entries generated, number of error messages), 3) app container activities and related information (e.g., app container start times, stop times, app container identification, metadata related to app container, app container resources used), and 4) network traffic reports and related statistics (e.g., amount of traffic to and from each app container). The monitoring agent 420 may store this information, and may forward it to the UI container 165 via the UI monitor 440.

Figure 4B:
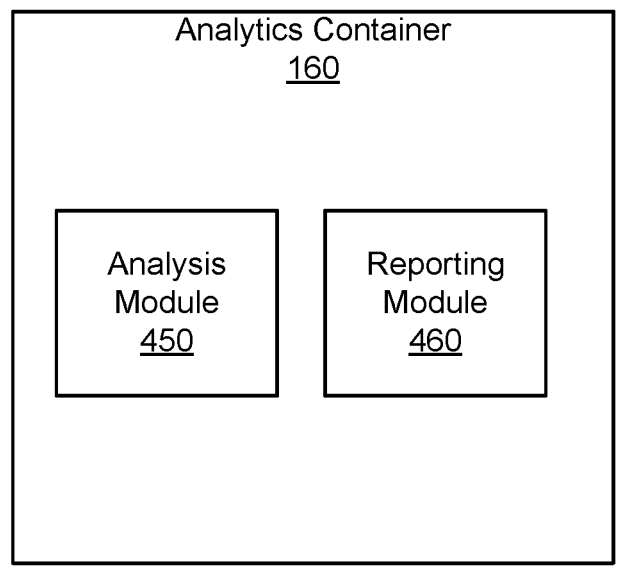
FIG. 4B illustrates the analytics container of FIG. 1, according to an example embodiment.

FIG. 4B illustrates the analytics container 160 of FIG. 1 according to an example embodiment. As illustrated, the analytics container 160 includes an analysis module 450 and a reporting module 460. Although the illustrated analytics container 160 includes the elements shown in FIG. 4B, in other embodiments the analytics container 160 may include different elements. Furthermore, the functionalities of each element may be distributed differently among the elements in other embodiments.

The analysis module 450 receives information, such as logs, statistics, and other information from the security containers 150 and performs various analysis on the information. The type of analysis applied by the analytics container 160 may be determined by configuration settings provided by the management container 155. The analysis may include statistical analysis, threat analysis, aggregation and reporting and so on.

In one embodiment, the analysis module 450 determines if a threat exists based on the information received from the security containers 150. The analysis module 450 may determine that a threat exists if it determines that the information received shows an abnormal pattern of behavior that varies a threshold amount from a historical behavior. The analysis module 450 may determine that a threat exists if certain criteria in the configuration settings are met. For example, the configuration settings may indicate that logs indicating a simultaneous increase in traffic activity for a certain set of app containers 120 of a single organization from multiple container servers 110 may indicate a potential threat. If the analysis module 450 determines that the logs from multiple security containers 150 indicates an increase in traffic corresponding to this rule, the analysis module 450 may log that a potential threat has or is occurring.

In one embodiment, the analysis module 450 performs a statistical analysis on the received information. The analysis module 450 performs various statistical analysis, such as a significance test, average, correlation, aggregation, regression curve, and so on, against categories of the information, such as traffic throughput, packet loss, types of packets seen, traffic and time of day, and so on. The analysis module 450 may filter the information, e.g., by app container 120 type, by container server 110, by geographical region of the traffic received, by traffic type, and so on, before performing the analysis. For example, the analysis module 450 may aggregate the amount of suspicious traffic organized by type of app container 120 to determine which app containers providing which services are faced with the most number of potential network threats.

In one embodiment, the analysis module 450 reports certain data based on the configuration settings provided by the management container 155. For example, the analysis module 450 may have received a configuration rule requesting to count a number of HTTP requests made to a particular app container 120.

Although examples of different analyses are described here, in other embodiments the analysis module 450 may perform other analyses against the received information.

The reporting module 460, in one embodiment, sends the analyses made by the analysis module 450 to the management container 155. The reporting module 460 may send this data upon request from the management container 155, or may send this information periodically (e.g., once every hour).

Example Flows

Figure 5:
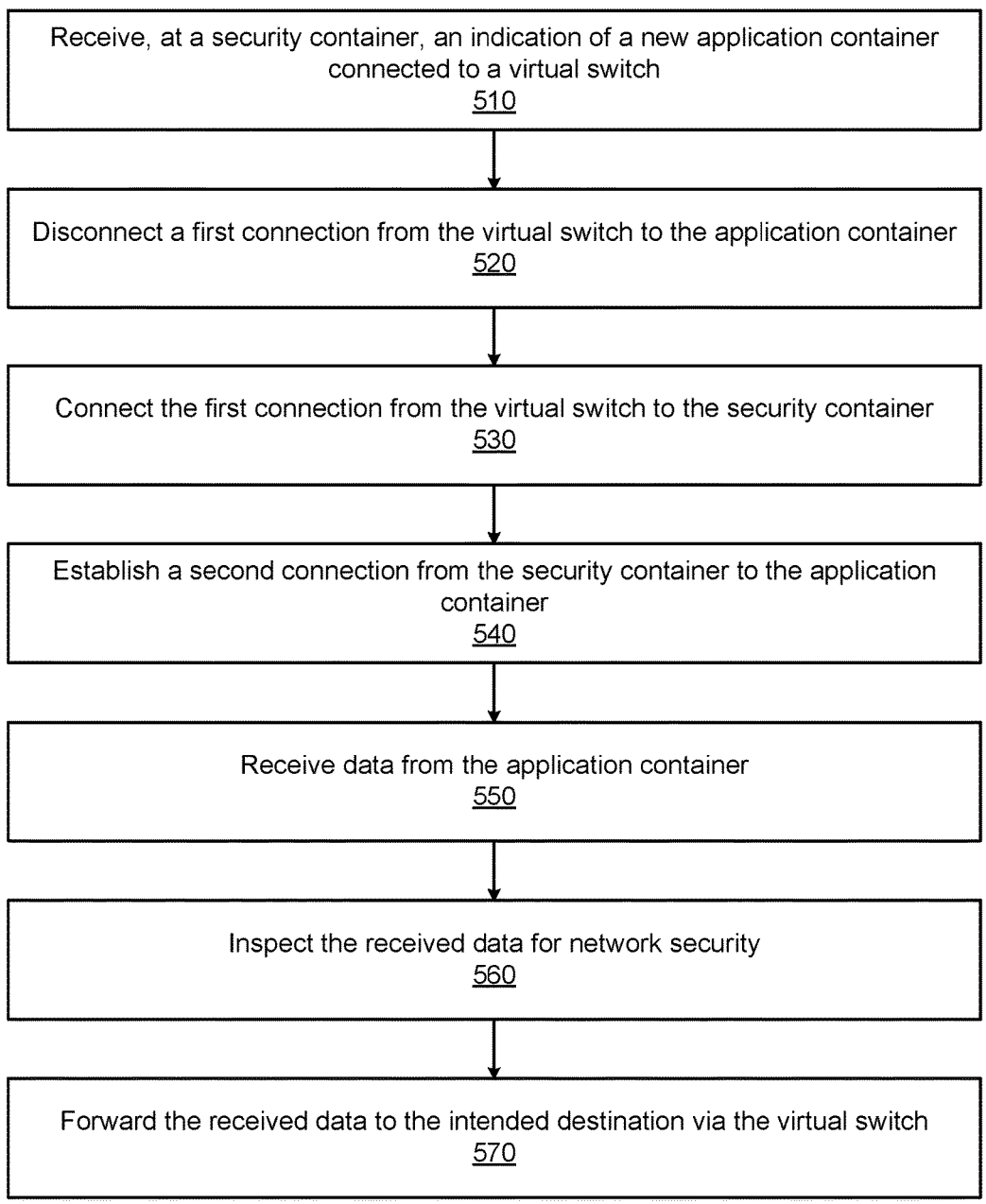
FIG. 5 is a flow chart illustrating an exemplary method for intercepting the traffic of an app container, according to one example embodiment.

FIG. 5 is a flow chart illustrating an exemplary method 500 for intercepting the traffic of an app container, according to one embodiment. In one embodiment, FIG. 5 attributes the steps of the method 500 to the security container 150. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 624, that may be executed by the processor 602 described with respect to FIG. 6.

The security container 150 receives 510 an indication of a new application container (e.g., application container 120) connected to a virtual switch (e.g., virtual switch 135) of a server (e.g., container server 110 or VM 115), the connection established by a container service providing operating system-level virtualization for each application container. As noted, the security container 150 may monitor via the container service the status of new app containers being initiated.

The security container 150 disconnects 520 a first connection from the virtual switch to the application container at the application container. To do this, the security container 150 may switch domain context to the application container, and move the port of the first connection from the application container. The security container 150 may store the routing information and network address for the first connection before disconnecting the first connection.

The security container 150 connects 530 the first connection from the virtual switch to the security container. Thus, the security container 150 moves the connection from the application container to the security container 150. The connection here is to communicatively connect the virtual switch and the security container together, for example, via protocol, API, via direct or indirect methods. The security container 150 may not disturb the connection at the virtual switch, and thus does not necessarily need to be able to process command specific to the version of virtual switch that is being used.

The security container 150 establishes 540 a second connection from the security container to the application container. This allows the security container 150 to reconnect the connection between the application container and the virtual switch. The security container 150 may also restore the routing entries for the application container.

The security container 150 receives 550 data from the application container. This data has an intended destination. The security container 560 inspecting the received data for network security. The security container 150 may determine, based on a particular set of rules, whether to drop the data or forward it to the intended destination. In some cases, the security container 150 may create a copy of the data while forwarding the original data, and inspect the copy instead.

The security container 150 transmits 570 the received data to an intended destination via the virtual switch. Thus, the security container 150 is able to transparently analyze the data for any security risks, without affecting the operation of the application container.

Example Machine Architecture

Figure 6:
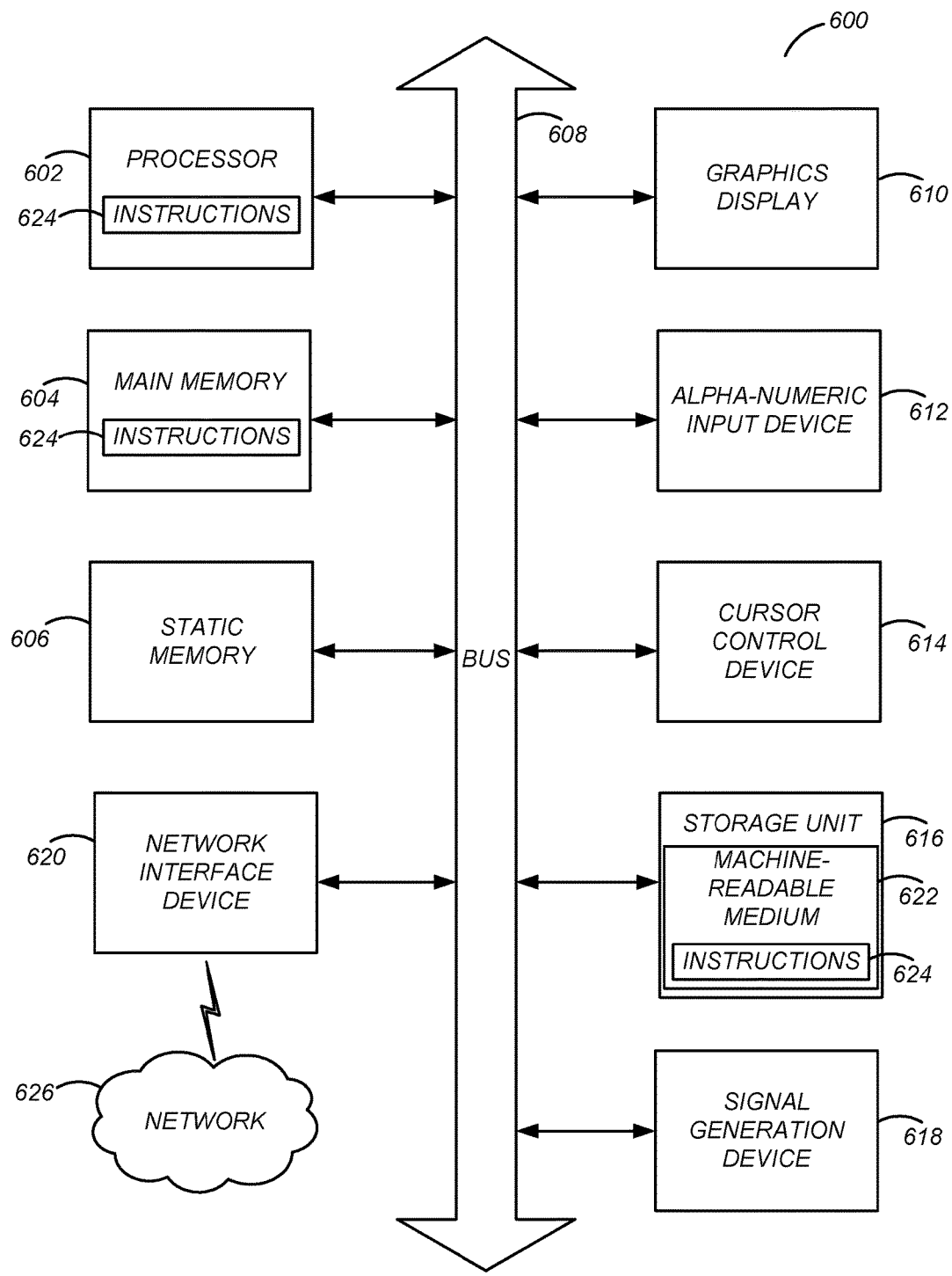
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 600 is used to execute the processes and functionality described in FIGS. 1-5.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to transparently monitor the security of a containerized system without having to intrude upon every single application container.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 602 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for transparent network security monitoring in a container environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, at a security container, an indication of a new application container connected to a virtual switch of a server, the connection established by a container service providing operating system-level virtualization for a plurality of application containers executing within an operating system, each application container of the plurality of application containers being a containerized software application, the container service limiting resources for each application container using one or more isolation features of the operating system;
   disconnecting, by the security container, a first connection from the virtual switch to the new application container at the new application container;
   responsive to receiving the indication of the new application container, connecting, by the security container, the first connection from the virtual switch to the security container;
   establishing, by the security container, a second connection from the security container to the new application container;
   receiving, at the security container, data from the new application container;
   inspecting, by the security container, the received data for network security; and
   transmitting, by the security container, the received data to an intended destination via the virtual switch.

2. The method of claim 1, further comprising:
   monitoring the server for an initiation of any new app container.

3. The method of claim 1, wherein the disconnecting the first connection is in response to:
   determining based on preconfigured rules that traffic of the new application container is to be intercepted, the preconfigured rules identifying one or more characteristics of the new application container.

4. The method of claim 1, wherein the disconnecting the first connection further comprises:
   storing one or more routing entries of the first connection;
   switching a current namespace to a namespace of the application container; and
   removing an interface of the first connection from the application container.

5. The method of claim 4, wherein the connecting the first connection further comprises:
   binding the interface of the first connection to the security container; and
   restoring the one or more routing entries of the first connection.

6. The method of claim 1, wherein the disconnecting the first connection further comprises:
   storing one or more routing entries of the first connection; and
   executing one or more system commands to remove an interface of the first connection from the application container.

7. The method of claim 1, further comprising storing the network address of the application container, and wherein the establishing a second connection further comprises:
   restoring the network address of the application container to the second connection.

8. A computing server comprising:
   a container service executing on the server, the container service providing an application programming interface for operating system-level virtualization;
   a virtual switch, the virtual switch configured to route network packets;
   a new application container including an image having executable code, the new application container being a containerized software application, the container service limiting resources for the new application container using one or more isolation features of an operating system; and
   a security container executing on the server, and configured to:
      receive from the container service an indication of the new application container being connected to the virtual switch;
      disconnect a first connection from the virtual switch to the new application container at the new application container;
      responsive to the receipt of the indication of the new application container, connect the first connection from the virtual switch to the security container;
      establish a second connection from the security container to the new application container;
      receive, at the security container, data from the new application container;
      inspect the received data for network security; and
      transmit the received data to an intended destination via the virtual switch.

9. The server of claim 8, wherein the security container is further configured to:
   monitor the server for an initiation of any new app container.

10. The server of claim 8, wherein the security container is further configured to disconnect the first connection is in response to a determination that the traffic of the new application container is to be intercepted based on preconfigured rules, the preconfigured rules identifying one or more characteristics of the new application container.

11. The server of claim 8, wherein the security container is further configured to:
   store one or more routing entries of the first connection;
   switch a current namespace to a namespace of the application container; and
   remove an interface of the first connection from the application container.

12. The server of claim 11, wherein the security container is further configured to:
   bind the interface of the first connection to the security container; and
   restore the one or more routing entries of the first connection.

13. The server of claim 8, wherein the security container is further configured to:
   store one or more routing entries of the first connection; and
   execute one or more system commands to remove an interface of the first connection from the application container.

14. The server of claim 8, wherein the security container is further configured to store the network address of the application container prior to the disconnection of the first connection, and wherein the security container is further configured to:
   restore the network address of the application container to the second connection.

15. A non-transitory computer storage readable medium configured to store instructions, the instructions that when executed by a processor, cause the processor to:
   receive, at a security container, an indication of a new application container connected to a virtual switch of a server, the connection established by a container service providing operating system-level virtualization for a plurality of application containers executing within an operating system, each application container of the plurality of application containers being a containerized software application, the container service limiting resources for each application container using one or more isolation features of the operating system;
   disconnect, by the security container, a first connection from the virtual switch to the new application container at the new application container;
   responsive to the receipt of the indication of the new application container, connect the first connection from the virtual switch to the security container;
   establish, by the security container, a second connection from the security container to the new application container;
   receive, at the security container, data from the new application container;
   inspect, by the security container, the received data for network security; and
   transmit, by the security container, the received data to an intended destination via the virtual switch.

16. The non-transitory computer storage readable medium of claim 15, wherein the non-transitory computer readable storage medium stores further instructions thereon, that when executed by the processor, causes the processor to:
   monitor the server for an initiation of any new app container.

17. The non-transitory computer storage readable medium of claim 15, wherein the non-transitory computer readable storage medium stores further instructions thereon, that when executed by the processor, causes the processor to:
   disconnect the first connection is in response to a determination that the traffic of the new application container is to be intercepted based on preconfigured rules, the preconfigured rules identifying one or more characteristics of the new application container.

18. The non-transitory computer storage readable medium of claim 15, wherein the non-transitory computer readable storage medium stores further instructions thereon, that when executed by the processor, causes the processor to:
   store one or more routing entries of the first connection;
   switch a current namespace to a namespace of the application container; and
   remove an interface of the first connection from the application container.

19. The non-transitory computer storage readable medium of claim 18, wherein the non-transitory computer readable storage medium stores further instructions thereon, that when executed by the processor, causes the processor to:
   bind the interface of the first connection to the security container; and
   restore the one or more routing entries of the first connection.

20. The non-transitory computer storage readable medium of claim 15, wherein the non-transitory computer readable storage medium stores further instructions thereon, that when executed by the processor, causes the processor to:
   store the network address of the application container prior to the disconnection of the first connection; and
   restore the network address of the application container to the second connection.

* * * * *